Nov. 14, 1961 R. K. BROWN 3,009,104
UNDERWATER SOUND VELOCITY METER
Filed July 30, 1958 3 Sheets-Sheet 1

INVENTOR.
RICHARD K. BROWN
BY
Louis B. Applebaum
ATTORNEYS

United States Patent Office 3,009,104
Patented Nov. 14, 1961

3,009,104
UNDERWATER SOUND VELOCITY METER
Richard K. Brown, Ann Arbor, Mich., assignor, by mesne assignments, to the United States of America as represented by the Secretary of the Navy
Filed July 30, 1958, Ser. No. 752,151
20 Claims. (Cl. 324—68)

This invention relates to improvements in apparatus for measuring the frequency of resonance of a cylindrical cavity and especially to an underwater sound velocity meter using a resonant cylindrical cavity.

The measurement of the velocity of sound in fluids, particularly sea water, has important applications in various fields. For example, knowledge of the velocity of sound in sea water permits the calculation of the range of surrounding objects from a sound-radiating source such as the sonar antenna of a submarine.

It has been found that the velocity of propagation of sound in a fluid contained in a cylindrical cavity is directly proportional to the frequency of resonance of the column of fluid in the cavity. Thus, if the frequency of resonance can be measured, the velocity of sound in the fluid can be determined from a mathematical formula or can be obtained by a direct reading if the frequency meter dial is calibrated in units of velocity.

Apparatus embodying this principle has been designed and successfully employed. However, the cavity has a tendency to resonate in different modes at different velocities of sound and a good meter must operate in one and only one transverse acoustical mode in order to provide meaningful readings.

The objects and advantages of the present invention are accomplished by providing a means which permits the selection of one particular mode of resonance from the many possible transverse modes in which the liquid-filled cavity may resonate.

A typical embodiment of the invention comprises a cylindrical water-filled cavity having a pair of piezoelectric transmitting transducers in contact with the outside of the cylinder and a receiving transducer situated between them at the center (axis) of the cylinder. The transducers and cylindrical cavity form a feedback loop from the output to the input of an amplifier. The remainder of the output of the amplifier is fed to a frequency meter which measures the frequency of resonance of the cylindrical cavity.

An object of this invention is to stabilize the operation of a sound-velocity meter employing a resonant cylindrical cavity so that the latter resonates in only one acoustical transverse mode throughout the range of the meter.

Another object is to measure the velocity of sound in fluids.

A further object is to measure the velocity of sound in sea water with a high degree of accuracy.

Yet another object is to provide a meter for measuring the velocity of sound in sea water, which is small, uncomplicated and portable.

Other objects and many of the attendant advantages of this invention will be readily appreciated as the same becomes better understood by reference to the following detailed description when considered in connection with the accompanying drawings wherein—

Figure 1:
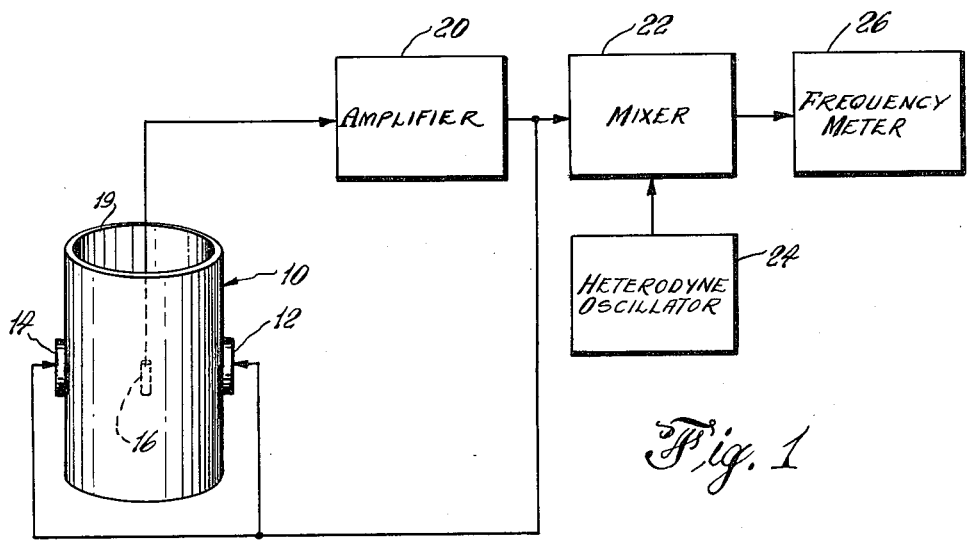
FIG. 1 is a diagrammatic representation in partially blocked form of an embodiment of the invention.

FIG. 1 illustrates a system adapted to measure the velocity of propagation of sound in a liquid medium by measuring the frequency of resonance of a cylindrical cavity filled with the liquid. A cylinder 10 is fabricated from a metal such as brass which will not corrode in sea water. A pair of piezoelectric transmitting transducers 12 and 14 are secured to opposite sides of the outer surface of the cylindrical cavity 10 by some suitable method such as cementing. The transducers 12 and 14 may comprise barium titanate crystals in disc form, for example. If so desired, reduction of the transmission of shear vibrations from one transducer to the other through the cylinder wall may be accomplished by inserting a rubber disc about ⅛ inch thick between each transducer and the cylinder wall. Castor oil forms a good bonding agent between crystal, rubber and cylinder.

A receiving transducer 16, preferably a miniature barium titanate crystal in cylindrical form, is mounted on the longitudinal axis of the cylindrical cavity 10. The crystal 16 may be held in place by a thin metal tube 18 which, in turn, may be mounted upon the wall of the cylinder 10 by any suitable means such as a tripod secured to the tube 18 and seated upon the wall 19 at the open end of the cylindrical cavity 10.

Typical dimensions for a cavity and crystals might be:
  Cylinder—3½ inch diameter; 1 foot length; ¼ inch wall thickness;
  Transmitting transducers (circular discs)—1 inch circular diameter; 0.27 inch thick; plated silver electrodes on the plane surfaces;
  Receiving transducer (cylinder)—1 1/16 inch diameter; ⅛ inch length.

The receiving transducer 16 is connected to the input of an amplifier 20. The output of the amplifier 20 is fed to the transmitting transducers 12 and 14 in parallel and to a mixer 22 where it is heterodyned with the output of a heterodyne oscillator 24 and converted to a lower frequency. The output of the mixer is connected to a frequency meter 26.

If desired, the frequency meter 26 may be connected to a recorder so that a record of the frequency or frequencies of resonance over a period of time may be kept. It is also possible to dispense with the mixer and heterodyne oscillator and apply the output of the amplifier directly to the frequency meter.

Figure 2:
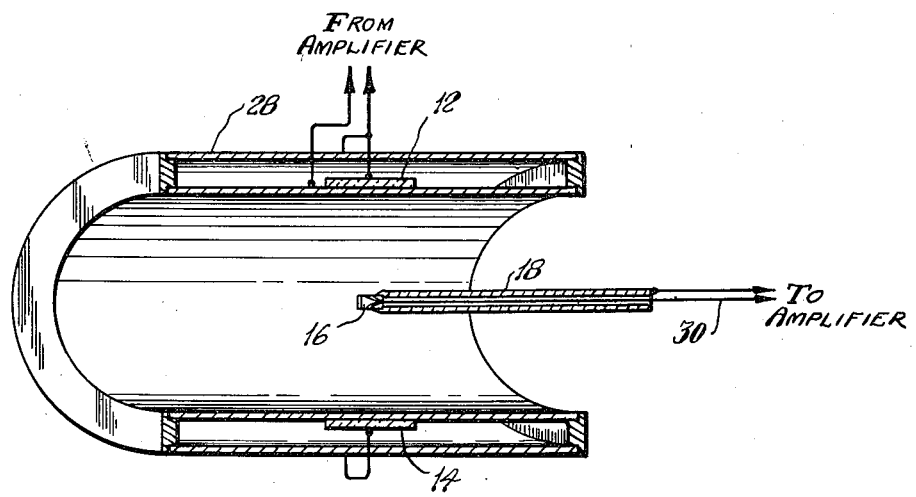
FIG. 2 is a cross-section of the cylindrical cavity taken through the longitudinal axis.

FIG. 2 shows in cross section the construction of the cylindrical cavity 10. An outer wall 28 is welded or otherwise secured to the cavity wall so that the transmitting transducers 12 and 14 lie in a water-tight compartment. The amplifier leads are connected to the silver plating on the outer surface of each disc transducer 12 and 14 and to the cylinder wall.

The receiving transducer 16 is held by a narrow metal tube 18 the inner surface of which is covered by a layer or film of electrical insulating material. A braided wire 30 running through the tube 18 connects the inner plated surface of the transducer cylinder to one of the input terminals of the amplifier 20, the other being connected to the tube 18 and thereby to the plating on the outer wall of the transducer cylinder.

Figure 3:
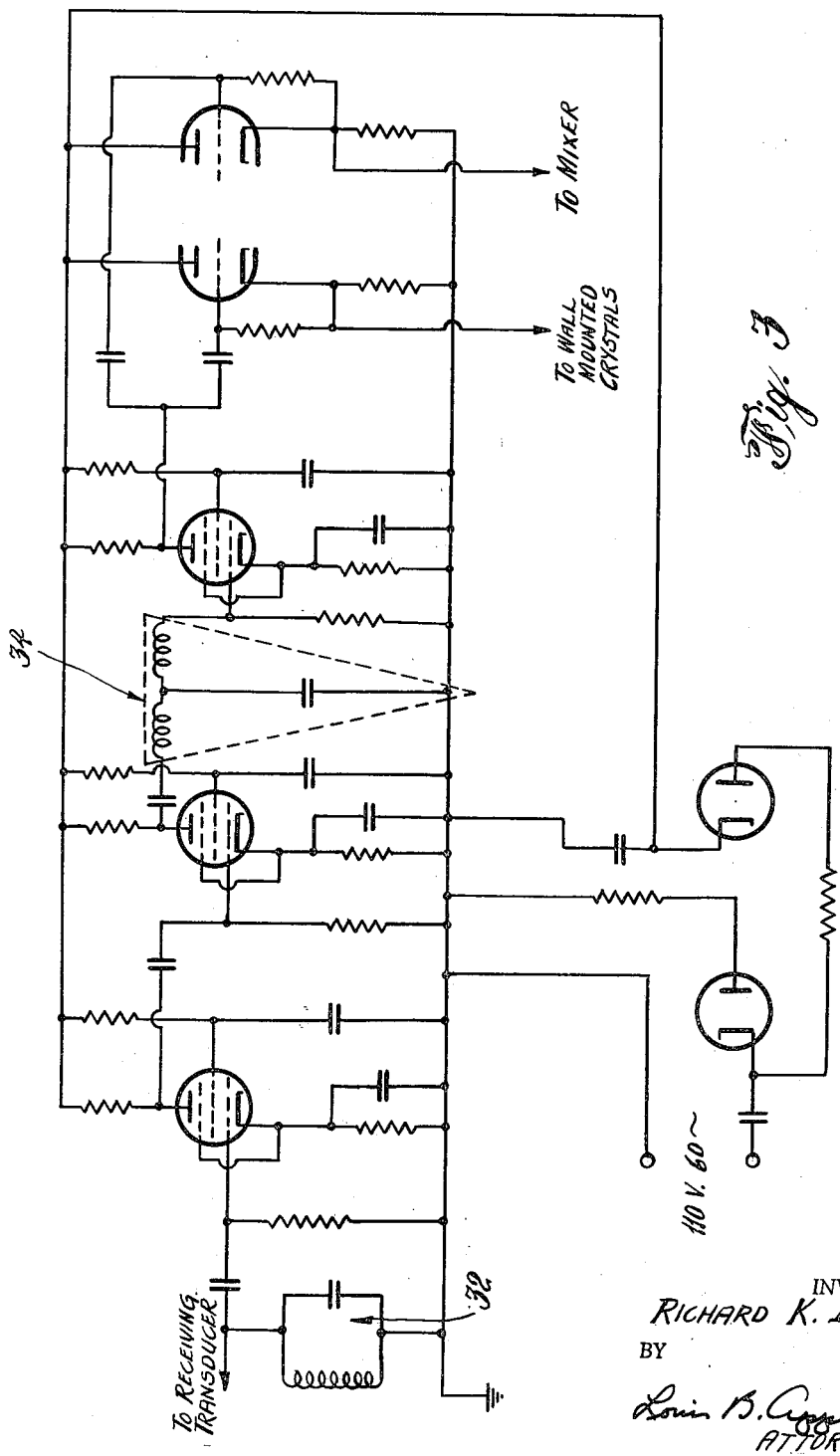
FIG. 3 is a schematic circuit diagram of an amplifier which can be employed in this invention.

FIG. 3 shows a schematic diagram of a three-stage amplifier 20 which can be used with the invention. The first stage is fed from a tuned parallel tank circuit 32. The amplifier stages are straightforward except that the output of the second stage is passed to the third stage through a band pass filter 34 having a bandwidth of no more than two to three kilocycles. The output of the third stage is applied to a pair of cathode followers which are connected in parallel, the output of one going to the transmitting transducers 12 and 14, and the output of the other going to the mixer 22 (or the frequency meter 26 if there is no mixer 22).

The acoustical cavity 10 forms a feedback circuit for the amplifier 20. Self-oscillation occurs at the resonant frequency of the cavity when phase conditions through the feedback path are correct to bring about a reinforcement of any signal originating at the amplifier input. The desired acoustical resonance in the cylinder is set up by transverse sound waves in the water, waves travelling perpendicularly to the cylinder axis and reflecting from the cylinder walls. A mixer 22 and heterodyne oscillator 24 are employed to bring the frequency down to the audio region where measurement is simplified and the relative frequency change produced by a given change in sound velocity is increased.

Figure 4:
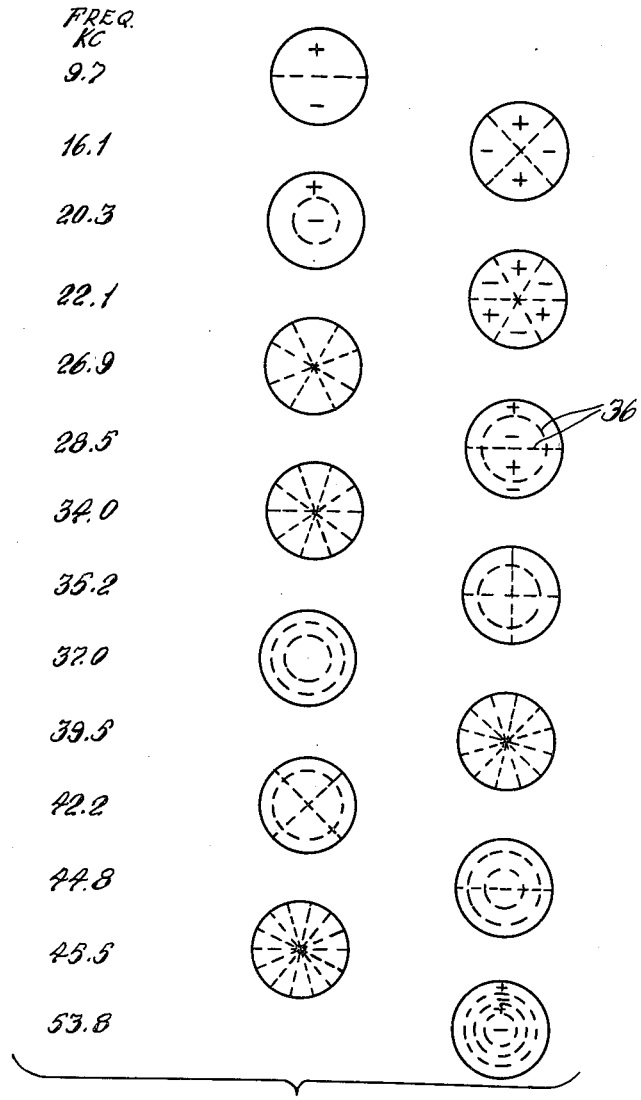
FIG. 4 is a sketch showing standing-wave pressure patterns and resonant frequencies for transverse acoustical modes of resonance of a 3½ inch diameter cylinder where the velocity of propagation is 4850 ft./sec.

It has been found that a cylindrical cavity tends to resonate at a series of different frequencies, each frequency of resonance being characterized by a different transverse acoustical mode. FIG. 4 shows the calculated resonant frequencies for a number of these modes and a sketch of the acoustical pressure nodes 36 of the standing waves for each of the various modes of vibration as they would appear in a cross-section of the cavity taken normal to the longitudinal axis. It is evident that three of the sketches (20.3, 37.0 and 53.8 kc.) show high pressure regions at the wall and at the center, or axis, of the cylinder and a phase reversal between the wall and axis regions of the cylinder. Furthermore, these there modes are widely separated from each other in frequency. This wide frequency separation is a desirabl condition since a narrow frequency separation between adjacent modes of oscillation makes it difficult to restrict oscillation to a single mode, a desideratum for a measuring instrument.

In order to obtain sufficient energy for oscillation, the transducers must be placed at high pressure regions. Also, since there is a 180 degree phase shift within the amplifier 20, there must be a phase shift of 180 degrees (or polarity reversal) between the output energy of the amplifier 20 and the energy applied to its input, in order for self-oscillation to be maintained. Of all the modes of oscillation shown, these conditions are satisfied for two of the aforesaid three modes of oscillation, and for no others, by locating the receiving transducer at the axis of the cavity and the transmitting transducers at the wall.

Thus, mode selection is accomplished by proper location of the transducers and by proper tuning of the amplifier. Additional stability is provided by inserting a narrow band pass filter in the amplifier.

For a cavity of the dimensions specified herein, the maximum change in resonant frequency over the extremes of sound velocity expected to be encountered in the ocean is about six percent. For a resonance in the 20 kilocycle region, this would result in a maximum resonant frequency change of about 1.2 kilocycles.

The tuned circuit 32, because of its low Q, is broadly tuned about 20.3 kilocycles as a center; it passes all frequencies of resonance of the cavity within the velocity range of the meter, although the frequencies around 20.3 kc. are passed with somewhat greater amplitude. The bandpass filter 34 is also tuned to a 20.3 kc. center frequency and passes frequencies in a band 2 to 3 kilocycles wide. It thus possesses a passband which is wide enough to cover the 1.2 kc. shift occurring over the range of sound velocities in sea water. The tuning of the tuned circuit 32 and filter 34 to a center frequency of 20.3 kc. and the narrowness of the pass band of the filter 34 permit the selection of a single mode of resonance of the cylinder 10, i.e., the mode having a frequency of 20.3 kc. for a sound velocity of 4850 ft./sec. in sea water.

The following is an example of the procedure which can be used to set up a sound velocity meter in accordance with the invention:

Since it is known that for a sound having a velocity of 4850 ft./sec., a resonant cavity of the type described herein resonates at the frequencies and in the modes shown in FIG. 4, and that the location of the transducers shown in FIG. 1 satisfies conditions for oscillation in the 20.3 and 53.8 kc. modes, a selection of one of these modes (e.g., 20.3 kc.) is made.

Parallel tuned circuit 32 and bandpass filter 34 are tuned to 20.3 kc. The heterodyne oscillator 24 is tuned to a frequency such as 21.3 kc. which, when mixed with 20.3 kc., provides an audio frequency which is approximately in the middle of the range of the frequency meter 26. (If the frequency meter 26 has a different mid-frequency, the frequency of the heterodyne oscillator 24 can be altered correspondingly.)

Frequency meter readings can now be converted to sound velocities (ft./sec.) since it is known that a velocity of sound of 4850 ft./sec. provides a frequency reading on the meter of 1000 kc. and that changes in velocity of sound will result in directly proportional changes of frequency. The meter dial can be made to indicate velocities directly, if desired.

To measure the velocity of a sound which is being propagated through a liquid, the resonant cavity is lowered into the water and the frequency meter is tuned to the frequency of the output of the mixer. The velocity of the sound is then read off the dial of the frequency meter.

Obviously many modifications and variations of the present invention are possible in the light of the above teachings. It is therefore to be understood that within the scope of the appended claims the invention may be practiced otherwise than as specifically described.

What is claimed is:

1. Apparatus for measuring the frequency of resonance of a liquid-filled resonant cavity comprising, in combination, a cylindrical resonant cavity, at least one piezoelectric transmitting transducer in contact with the outer surface of said cavity, a piezoelectric receiving transducer located inside said cavity on the longitudinal axis thereof, an electronic amplifier having an odd number of stages, said amplifier including tuning means permitting said amplifier to pass frequencies characteristic of only one predetermined mode of oscillation of said cavity, the input of said amplifier being derived from said receiving transducer and a part of the output of said amplifier being fed to said transmitting transducer, and a frequency meter for measuring the frequency of the output of said amplifier.

2. In a meter for measuring the velocity of propagation of sound in a liquid, said meter being of the type which measures velocity of propagation of sound in terms of the frequency of resonance of a liquid-filled cylindrical cavity resonator, and said meter comprising an electronic amplifier including tuning means permitting only a narrow preselected band of frequencies to pass therethrough, a cylinder forming a feedback path around said amplifier and means for measuring the frequency of the output of said amplifier, a piezoelectric receiving transducer located on the longitudinal axis of said cylinder and connected to feed its output as an input to said amplifier, and at least one piezoelectric transmitting transducer in contact with the wall of said cylinder and connected to receive the output of said amplifier, said cylinder being capable of oscillating in various transverse acoustical modes, the physical arrangement of said transducers being adapted to permit said cylinder to oscillate only in those few modes in which high acoustical pressure regions exist at both the wall and the axis of said cylinder, the tuning of said amplifier restricting oscillation of said cylinder to only one of these permissible modes.

3. Apparatus as set forth in claim 2, including at least two transmitting transducers disposed diametrically opposite each other in contact with the outer surface of the cylinder wall, said receiving transducer being located between said transmitting transducers on the longitudinal axis of said cylinder.

4. Apparatus as set forth in claim 3, wherein said cylinder is formed from a metal.

5. Apparatus as set forth in claim 3, wherein said transducers are barium titanate crystals.

6. In a meter for measuring the velocity of propagation of sound in a liquid, said meter being of the type in which the velocity of propagation of the sound is measured in terms of the frequency of resonance of a liquid-filled cylindrical cavity resonator, and said meter comprising an odd-staged electronic amplifier having tuning means permitting only a narrow preselected band of frequencies to pass therethrough, a cylinder forming a feedback path around said amplifier whereby self-oscillation is induced, and means for measuring the frequency of the output from said amplifier, a piezoelectric receiving transducer located on the longitudinal axis of said cylinder and having its output connected as an input to said amplifier, and at least one piezoelectric transmitting transducer connected to receive part of the output of said amplifier and in contact with the wall of said cylinder for inducing vibration therein, said cylinder being capable of oscillating in various transverse acoustical modes, the physical arrangement of said transducers being adapted to permit said cylinder to oscillate only in those few modes in which high acoustical pressure regions exist at both the wall and axis of said cylinder and in which there is a reversal of polarity between the acoustical waves at the receiving and transmitting transducers, the tuning of said amplifier restricting oscillation of said cylinder to only one of these permissible modes.

7. Apparatus as set forth in claim 6, including at least two transmitting transducers disposed diametrically opposite each other at the cylinder wall, said receiving transducer being located between said transmitting transducers on the longitudinal axis of said cylinder.

8. Apparatus as set forth in claim 7, wherein said cylinder is formed from a metal and said transducers are barium titanate crystals.

9. Apparatus as set forth in claim 7, wherein said receiving transducer is a miniature, cylindrical, piezoelectric transducer.

10. A device for deriving an electrical signal from a sound wave in a liquid medium comprising, in combination: a resonant cavity; first sound transducing means, in contact with said cavity, for transducing an electrical signal into a sound signal; second transducing means, located internally of said cavity for transducing a sound signal into an electrical signal; and amplifying means having an input and an output circuit, said second transducing means generating an electrical output signal from said sound wave and applying said electrical signal to said input circuit of said amplifier, a portion of the output of said amplifier being applied to said first transducing means which generates a sound signal which reinforces the original sound wave to form resonant modes of oscillation within said cavity, said amplifier including filter means having characteristics such that only frequencies associated with a single resonant mode of oscillation are passed through said amplifier.

11. A device as set forth in claim 10, wherein said first transducing means is at least one piezoelectric crystal.

12. A device as set forth in claim 10, wherein said second transducing means is at least one piezoelectric crystal.

13. A device as set forth in claim 10, wherein said first transducing means comprises a pair of disk-type piezoelectric crystals located on opposite sides of said cavity and said second transducing means comprises a cylindrical piezoelectric crystal.

14. A device as set forth in claim 10, wherein said filter means includes a narrow-bandpass electrical filter.

15. A device as set forth in claim 10, wherein said filter means includes a low-Q tuned circuit and a narrow-bandpass electrical filter, the center frequency of both of these components being chosen so that it coincides with the center frequency of said single mode of oscillation, the range of frequencies of said single mode of oscillation being determined by the range of velocities of sound in said liquid medium.

16. A device for deriving an electrical signal from a sound wave in a liquid medium comprising, in combination: a cylindrical resonant cavity; first sound transducing means, in contact with said cavity, for transducing an electrical signal into a sound signal; second transducing means, located internally of said cavity upon its axis, for transducing a sound signal into an electrical signal; and amplifying means having an input and an output circuit, said second transducing means generating an electrical output signal from said sound wave and applying said electrical signal to said input circuit of said amplifier, a portion of the output of said amplifier being applied to said first transducing means which generates a sound signal which reinforces the original sound wave to form resonant modes of oscillation within said cavity, said amplifier including filter means having characteristics such that only frequencies associated with a single resonant mode of oscillation are passed through said amplifier.

17. A device as set forth in claim 16, wherein said filter means includes a narrow-bandpass electrical filter.

18. A device as set forth in claim 16, wherein said filter means includes a low-Q tuned circuit and a narrow-bandpass electrical filter, the center frequency of both of these components being chosen so that it coincides substantially with the center frequency of said single mode of oscillation, the range of frequencies of said single mode of oscillation being determined by the range of velocities of sound in said liquid medium.

19. A device as set forth in claim 18, wherein said first transducing means and said second transducing means comprise piezoelectric crystals.

20. A device as set forth in claim 18, wherein said first transducing means comprises a pair of disk-type piezoelectric crystals located on opposite sides of said cylindrical cavity and said second transducing means comprises a cylindrical piezoelectric crystal.

References Cited in the file of this patent

UNITED STATES PATENTS

| | | |
|---|---|---|
| 2,310,783 | Helmbold | Feb. 9, 1943 |
| 2,480,646 | Grabau | Aug. 30, 1949 |
| 2,686,294 | Hower | Aug. 10, 1954 |
| 2,700,894 | Valkenburg | Feb. 1, 1955 |
| 2,758,663 | Snavely | Aug. 14, 1956 |
| 2,824,284 | Johnson | Feb. 18, 1958 |
| 2,871,460 | Beebe | Jan. 27, 1959 |
| 2,901,698 | Tomiyasu | Aug. 25, 1959 |

OTHER REFERENCES

"The Vibratron," Electronics Industries, April 1945, pp. 79, 80, 192, 194 and 196.